Feb. 23, 1971 E. C. NAUMANN ET AL 3,564,906

ARBITRARILY SHAPED MODEL SURVEY SYSTEM

Filed Oct. 23, 1967 3 Sheets-Sheet 1

INVENTORS
EUGENE C. NAUMANN
BRUCE FLAGGE

ATTORNEYS

United States Patent Office 3,564,906
Patented Feb. 23, 1971

3,564,906
ARBITRARILY SHAPED MODEL SURVEY SYSTEM
Eugene C. Naumann, Newport News, and Bruce Flagge, Yorktown, Va., assignors to the United States of America as represented by the Administrator of the National Aeronautics and Space Administration
Filed Oct. 23, 1967, Ser. No. 677,475
Int. Cl. G01d
U.S. Cl. 73—71.4                                    5 Claims

ABSTRACT OF THE DISCLOSURE

An apparatus for detecting and measuring structural deformations, either static or dynamic, of arbitrarily shaped models. The apparatus includes a subsystem using feedback control to maintain a non-contacting deformation measuring sensor a predetermined distance from the model. A comparison subsystem compares the signal from the non-contacting deformation measuring sensor with a reference signal, and controls the polarity of the deflection analog signal. The analog signal is applied through an electronic amplifying and manipulating subsystem to an electronic display. In addition, apparatus is provided for moving the non-contact deformation measuring sensor over the surface of an arbitrarily shaped model.

The invention described herein was made by employees of the United States Government and may be manufactured and used by or for the Government for governmental purposes without the payment of any royalties thereon or therefore.

BACKGROUND OF THE INVENTION

Many structural research investigations require the measurement of static and dynamic displacement amplitudes. Numerous prior art systems have been developed for making these measurements. Some prior art systems have mounted measuring devices such as accelerometers and vibration sensors directly onto the model under test. The output from these sensors is recorded and used to detect static and dynamic displacements. However, the addition of accelerometers and other vibration sensors directly onto the model cause erroneous indications. While these errors may be small for heavy structures, they are large for thin, light structures. Hence, these types of prior art systems are unsuitable for use with certain types of structures.

The prior art has also used non-contacting sensors in systems that are large and cumbersome. In addition, the measurements are made at discrete points after a period of time necessary for vibrations caused by moving the probe to subside. Moreover, the signals from these systems are fed into converters and switched by means of electromechanical systems to provide the proper polarity. Because the response time of electromechanical systems is long, they are undesirable for continuous readout which occurs when the sensor moves over the surface of the model under investigation in a continuous manner.

Therefore, it is an object of this invention to provide a new and improved system for detecting and measuring the structural deformation of a model.

It is also an object of this invention to provide a new and improved apparatus for detecting and measuring the structural deformation, either static or dynamic, of an arbitrarily shaped model.

It is also an object of this invention to provide a new and improved apparatus for detecting and measuring the structural deformation of a thin light, arbitrarily shaped model that is non-contacting and that can provide a continuous readout while continuously moving over the surface of the model.

SUMMARY OF THE INVENTION

In accordance with a principle of this invention, a non-contacting apparatus for detecting the static and/or dynamic structural deformations of an arbitrarily shaped model is provided. A servo-loop controlled non-contacting deformation measuring sensor is located at a predetermined distance from the model. A second or referenced sensor is also located near the model. The outputs from the two sensors are compared in a comparison means. And, the comparison means generates an analog output signal related to the comparison between the two signals. Specifically, the analog output signal from the comparison means is related to the structural deformation characteristics of the model.

In accordance with a further principle of the invention, the output from the comparison means is applied to an electronic means wherein it is manipulated prior to application to an electronic display device.

In accordance with another principle of this invention, a novel means is provided for moving the non-contacting deformation measuring sensor over the surface of the arbitarily shaped model.

It will be appreciated by those skilled in the art and others, that the use of non-contacting sensors reduces error, because the sensors are not directly mounted on the model under investigation. Further, the comparison of signals from the con-contacting deformation measuring sensor and the reference sensor results in the generation of a signal that is directly related to the deformation of the model. After suitable electronic manipulation, this signal can be recorded on a recording means or displayed on a display means. In addition, the inclusion of means for moving the non-contacting deformation measuring sensor over the surface of the model under test results in a system that can be continuously read out while continuously surveying the surface of the model.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENTS

Figure 1:
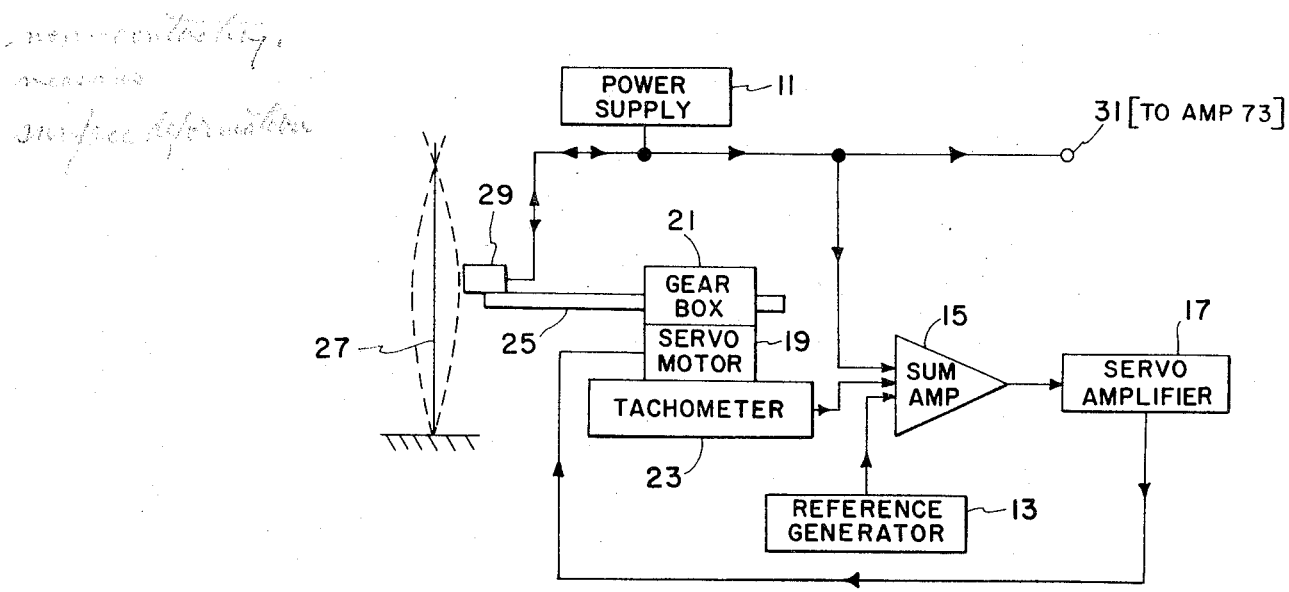
FIG. 1 is a partially perspective and partially block diagram of the servo-loop control system for the non-contacting deformation measuring sensor of the invention.

FIG. 1 is a block diagram of the closed servo-loop control system of the invention that comprises a power supply 11, a reference generator 13, a three input summing amplifier 15, a servo amplifier 17, and a servo motor 19. A gear box 21 is connected to one end of the shaft of the servo motor 19 and a tachometer 23 is connected to the other end of the shaft. The gear box 21 is attached to and moves a rod 25 toward or away from a model 27 illustrated for ease of discussion as a flat upwardly extending plate. One suitable method of creating movement of the rod is for the teeth of the gears to interact with longitudinal teeth on the rod. Mounted on the end of the shaft 25 is a non-contacting sensor 29. Hence, as the shaft moves toward or away from the model 29, the sensor moves toward or away from the model.

The power supply 11 is connected to the sensor 29 and to one input of the summing amplifier 15. In addition, the power supply is connected to an output terminal 31. In operation, the non-contacting sensor 29 modulates the output from the power supply 11 and this modulated output is applied to the output terminal 31 and the summing amplifier 15.

The output from the tachometer 23 is connected to the second input of the summing amplifier and the output from the reference generator 13 is connected to the third input of the summing amplifier. The output from the summing amplifier is connected to the input of the servo amplifier 17, and the output of the servo amplifier is connected to the servo motor 19. Hence, the summing amplifier, the servo amplifier, the tachometer and the servo motor in cooperation with the reference generator and the power supply comprise a closed loop servo system. That is, as the tachometer output signal changes, the output from the summing amplifier and the servo amplifier change. This change changes the amount of energy applied to the servo motor 19. The change in energy to the servo motor 19 moves the rod 25 and movement of the rod moves the sensor toward or away from the model. Movement of the sensor changes its output signal and, consequently its input signal to the summing amplifier. This operation continues until the closed loop system becomes stable; that is, this operation continues until a null is achieved. When the closed loop system becomes stable, the servo motor stops moving the sensor.

In accordance with the foregoing description, it will be appreciated that, as the model 27 rapidly moves between its dotted positions (illustrated in FIG. 1), the sensor 29 will keep a predetermined average distance from the model and measure the deflection.

Figure 2A:
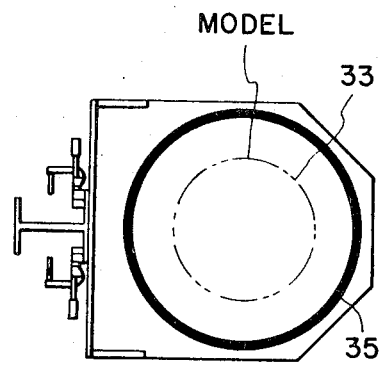
FIG. 2A–D are perspective diagrams illustrating various systems for moving the non-contacting deformation measuring sensor over the surface of a model.

FIGS. 2A–D illustrate various apparatus for moving the non-contacting deformation sensor 29 of FIG. 1 over the surface of various arbitrarily shaped models. FIG. 2A illustrates a cylindrical model 33, such as a tube, located inside of a circular track 35. The non-contacting deformation sensor, though not specifically illustrated, is mounted on a trolley that moves along the track 35 and through any appropriate means is moved around the periphery of the circular model. For example, the trolley may include a servo motor and gear arrangement that moves the sensor about the model as the gears interact with teeth on the track. Hence, the sensor moves around the model, along the track, as it moves toward and away from the model in the manner described with respect to the operation of the sensor illustrated in FIG. 1.

The track 35 of FIG. 2A is movably attached to an I-beam by a plate. The I-beam is fixedly attached to any suitable support structure by means not shown. Means are provided for moving the track along the I-beam in the transverse direction of the longitudinal axis of the cylindrical model. This latter means may include a servo-motor gear arrangement mounted on the plate that interacts with teeth on the I-beam, for example.

Figure 2B:
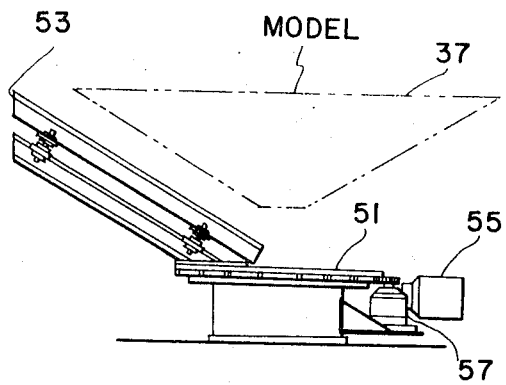

FIG. 2B illustrates a means for moving the non-contacting deformation sensor about a conical model 37. A turntable 51 is attached to a track 53 projecting from the surface of the turntable at an acute angle (related to the angle of the conical model). The turntable is moved by a motor 55 through a gear box 57. As the turntable is moved, it moves the track 53 about the surface of the conical model 37. In addition, a trolley moves along the length of the track by the servo motor-gear arrangement described with respect to FIG. 2A, for example.

Figure 2C:
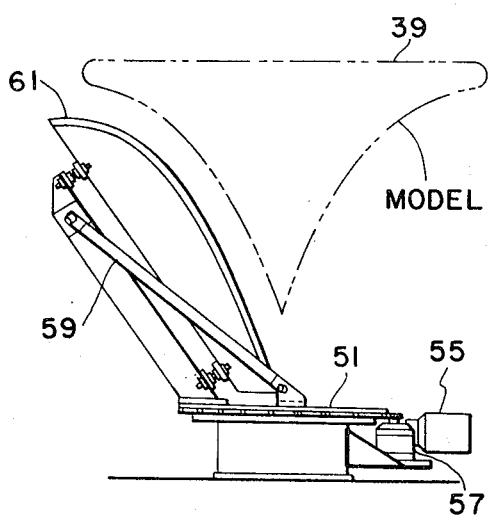

FIG. 2C illustrates a system for moving the non-contacting deformation sensor about the surface of a complex curvature model 39. A mounting arrangement 59 is angularly attached to the top of a turnable 51 of the type illustrated in FIG. 2B. The mounting arrangement 59 includes a curved track 61 with a curvature generally similar to the curvature of the surface of the model 39. As with the embodiment illustrated in FIGS. 2A and 2B, the non-contacting deformation measuring sensor is mounted in a trolley that moves along the track while the turntable moves the track. In this manner, the entire surface of the model 39 is surveyed.

Figure 2D:
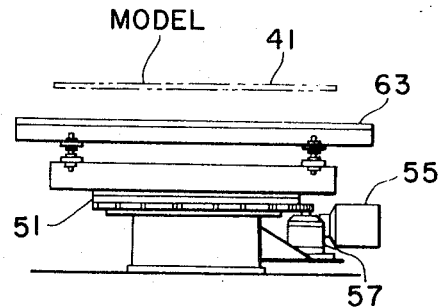

FIG. 2D provides an apparatus for surveying the surface of a flat model 41. A turntable 51 of the type illustrated in FIGS. 2B and 2C driven by a motor 55 through a gear box 57 is provided. A flat track 63 is mounted on the top of the turntable 51 adjacent to the model 41 so that the entire surface of the model is surveyed.

The center of rotation of the turntables illustrated in FIGS. 2B, 2C and 2D is on the axis of symmetry of the model. Circumferential modal patterns are measured by rotating the track around the model using the motor and gear box. Meridional modal patterns are measured by moving the non-contacting deformation sensor along the track. Preferably, the turntable has a large diameter for stability and can be mounted in any desired orientation. In addition, it will be appreciated that various geometrical track assemblies, other than those illustrated in FIGS. 2B, 2C and 2D, can be attached to the turntable. Hence, the system is extremely versatile.

Figure 3:
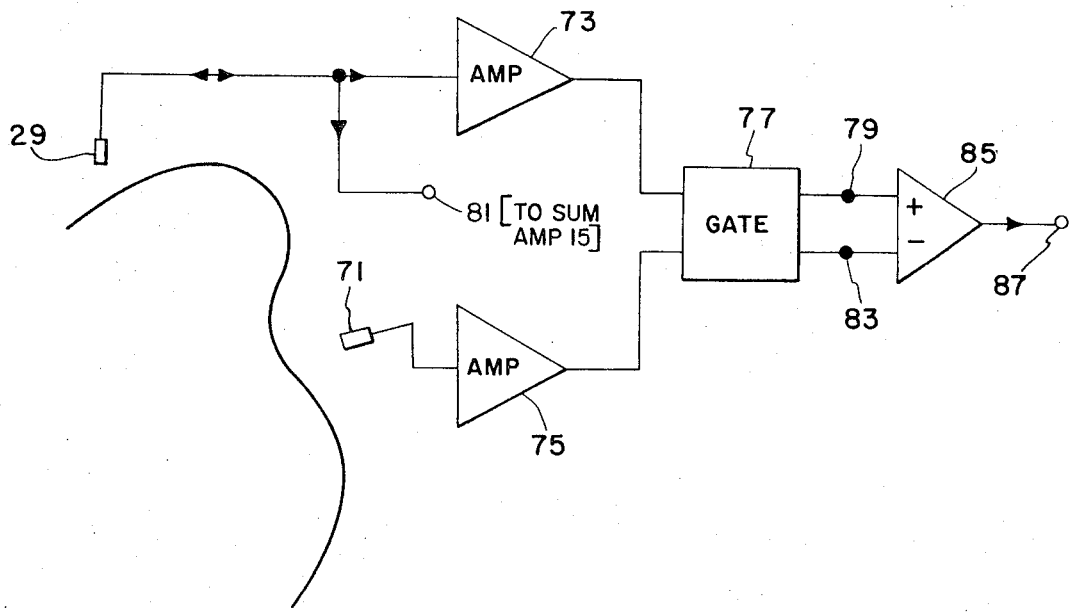
FIG. 3 is a partially perspective and partially block diagram illustrating the comparison means of the invention.

FIG. 3 illustrates a signal processing system suitable for use with the invention and comprises the non-contacting deformation measuring sensor 29, a reference sensor 71, a first amplifier 73, a second amplifier 75, a third amplifier 85 and a gate 77. The output from the non-contacting deformation sensor 29 is connected to the input of the first amplifier 73. Similarly, the output from the reference sensor 71 is connected to the input of the second amplifier 75. The outputs of the first and second amplifiers are connected to separate inputs of the gate 77 and the outputs of the gate 77 are connected to a pair of terminals 79 and 83. The terminals 79 and 83 are connected to positive (+) and negative (−) inputs of the third amplifier 85. The output of the third amplifier 85 is connected to an output terminal 87. In addition, the output from the sensor 29 is connected to an output terminal 81 to provide the feedback for the servo-loop system illustrated in FIG. 1. The model under examination is illustrated as an irregular line on the left portion of FIG. 3.

The reference sensor 71 is fixedly mounted adjacent to the model. The reference sensor 71, like the non-contacting deformation measuring sensor 29, can be any type of several types of non-contacting sensors such as capacitive sensors, inductive sensors or optical sensors. In general, the only limitation on the sensors is that the sensitivity of the sensors and their physical characteristics must not compromise tests by bringing error into the analog signal. Such error might occur if the model is light weight and the sensor is directly attached to it.

The output of the reference sensor is amplified by the second amplifier 75 and used to drive or control the gate 77. Hence, the gating device is driven at the vibrating frequency and is in phase with the vibration at the input of the reference sensor.

The signal from the non-contacting deformation sensor 29 is amplified by the first amplifier 73 and fed through the gate 77 to either of the pair of terminals 79 or 83. Signals applied to the third amplifier 85 from terminal 79 are positive and passed to the output terminal 87 unchanged in polarity while signals applied from terminal 83 are negative and reversed in polarity. The output from the amplifier 85 is a series of continuous half waves which are positive if the vibrations at the reference transducer and at the moving transducer are in phase and negative if the vibrations are out of phase. Thus, a low ripple analog signal is obtained at the output terminal 87. The magnitude of the signal is proportional to the sensed motion of the model and its polarity is determined by the phase relationship between the vibration at the reference probe and the moving probe.

It has been found that the system illustrated in FIG. 3 has a very high response that does not degrade the signal. In addition, it has been found that this system can evaluate the phase lags in the vibration of the model relative to the reference by evaluating the ripple magnitude of the output of the amplifier 85.

Figure 4:
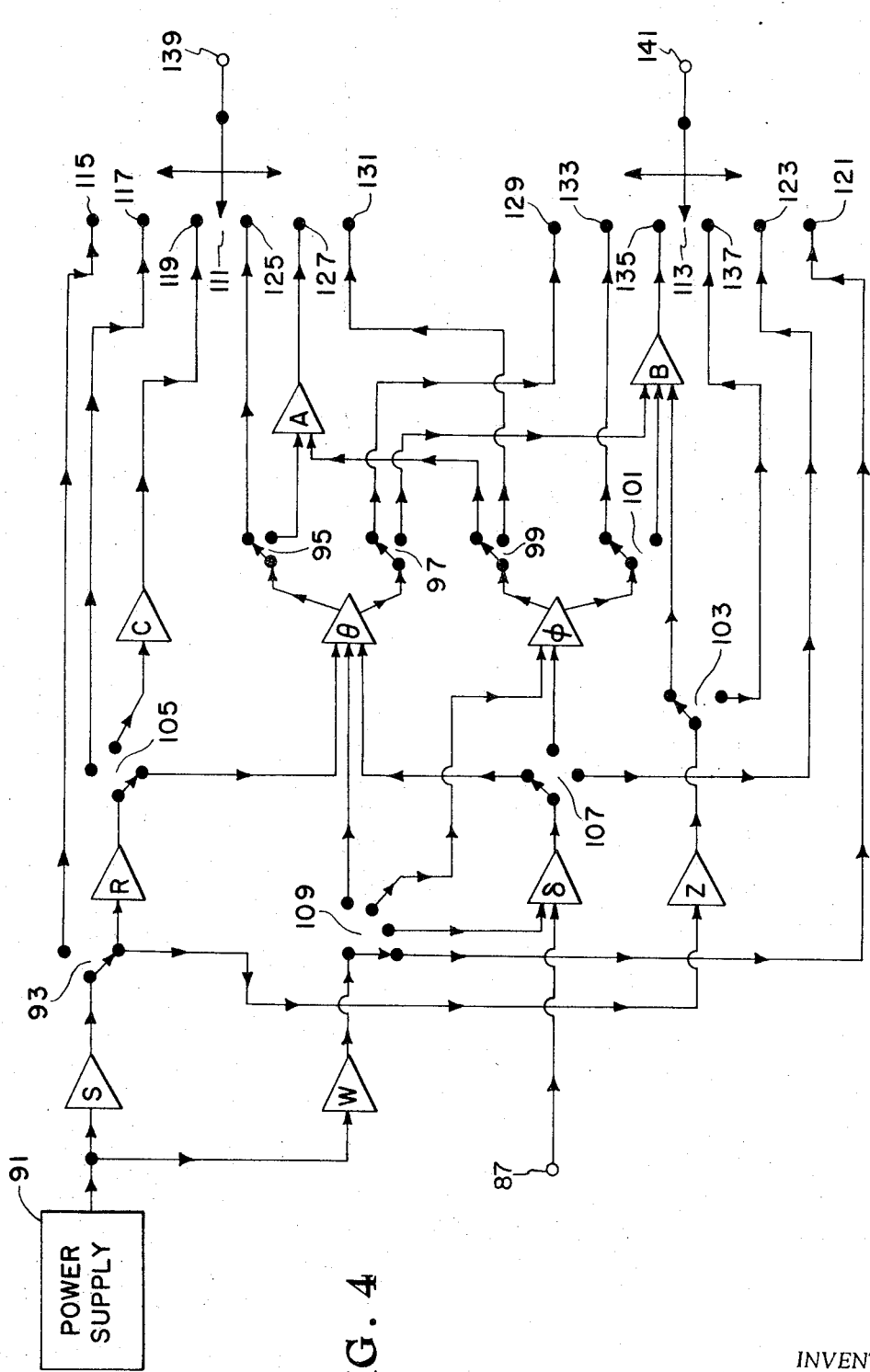
FIG. 4 is a block diagram illustrating the electronic manipulating means of the invention.

The output from the amplifier 85 of FIG. 3 is connected to the signal processing network illustrated in FIG. 4. This signal processing network comprises a plurality of operational amplifiers under the control of various portions of the moving elements of the heretofor described system, such as the movement of the trolley and the rotation of the servo motor which maintains the non-contacting deformation measuring sensor at a fixed distance from the model. Each amplifier is identified by a symbol which represents a function that either controls the gain of the amplifier or denotes the signal passed by the amplifier. These symbols and their meanings are as follows:

δ is the analog signal from the signal processing section illustrated in FIG. 3. This amplifier has multiple gain settings.

S is a DC voltage that is proportional to the distance of travel of the trolley along the track. Preferably, a linear potentiometer fastened to the trolley acts as a variable gain control.

W is a DC voltage that is proportional to the rotation of the servo motor which drives the moving transducer to maintain a fixed distance between the transducer and the model. Preferably, a linear potentiometer acts as a variable gain control for this amplifier.

R and Z are two resistances that act as voltage dividers used to proportion the S voltage into instantaneous components of the radius (R) and the altitude (Z) of the track from the turntable. Preferably, these resistance voltage dividers are fixed for the cylindrical, conical and flat models and variable for the complex curvature model. In addition, preferably, the gain of each of these amplifiers is unity.

C is a linear potentiometer driven by the rotation of the turntable to convert the instaneous value of the radius voltage to any equivalent circumferential voltage.

φ is a sine-cosine resolver referenced to gravity that is mounted on the trolley so that the signals δ and W can be resolved continuously into their vertical and horizontal components regardless of the orientation of the trolley.

θ is a sine-cosine resolver driven by the turntable rotation which is used to resolve signals (δ, W, R) for polar plotting in an X–Y plane.

A and B are summing devices with unity gain.

In addition to the operational amplifiers, the system illustrated in FIG. 4 includes a power supply 91, six single-pole, double-throw switches (SPDT) 93, 95, 97, 99, 101 and 103, two single-pole, triple-throw switches (SPTT) 105 and 107, a single-pole, quad-throw switch (SPQT) 109, and two single-pole six contact switches 111 and 113.

The output of the power supply is connected to the inputs of the S and W operational amplifiers. The output from the S amplifier is connected to the common terminal of the first SPDT switch 93. One terminal of the first SPDT switch is connected to a first terminal 115 of the first six contact switch 111. The second terminal of the first single-pole, double-throw switch 93 is connected to the inputs of the R and Z operational amplifiers.

The output of the R operational amplifier is connected to the common terminal of the first SPTT switch 105. One terminal of the first SPTT switch 105 is connected to the second terminal 117 of the first six contact switch 111. The second terminal of the first SPTT switch 105 is connected to the input of the C operational amplifier and the third pole of the first SPTT switch is connected to one input of the θ operational amplifier. The output from the C operational amplifier is connected to the third terminal 119 of the first six contact switch 111.

The ouput of the W operational amplifier is connected to the common terminal of the SPQT switch 109. One terminal of the SPQT switch 109 is connected to a second input of the θ operational amplifier. The second terminal of the SPQT switch 109 is connected to one input of the φ operational amplifier, and the third terminal of the SPQT switch is connected to one input of the δ operational amplifier. The fourth terminal of the SPQT switch 109 is connected to the first terminal 121 of the second six contact switch 113. Further, terminal 87, which is connected to the output of the signal processing network of FIG. 3, is connected to the second input of the δ operational amplifier.

The output of the δ operational amplifier is connected to the common terminal of the second SPTT switch 107. One terminal of the second SPTT switch 107 is connected to a third input of the θ operational amplifier. The second terminal of the second SPTT switch is connected to a second input of the φ operational amplifier. And, the third terminal of the second SPTT switch is connected to a second terminal 123 of the second six contact switch 113.

One output of the θ operational amplifier is connected to the common terminal of the second SPDT switch 95. One terminal of the second SPDT switch is connected to the fourth terminal 125 of the first six contact switch 111. The second terminal of the second SPDT switch 95 is connected to one input of summing amplifier A. The output of summing amplifier A is connected to the fifth terminal 127 of the first six contact switch 111.

The second output of the θ operational amplifier is connected to the common terminal of the third SPDT switch 97. One pole of the third SPDT switch is connected to the third terminal 129 of the second six contact switch 113. The second pole of the third SPDT switch is connected to one input of summing amplifier B.

One output of the φ operational amplifier is connected to the common terminal of the fourth SPDT switch 99. One terminal of the fourth SPDT switch 99 is connected to the second input of summing amplifier A. The second terminal of the fourth SPDT switch 99 is connected to the sixth terminal 131 of the first six contact switch 111.

The second output of the φ operational amplifier is connected to the common terminal of the fifth SPDT switch 101. One terminal of the fifth SPDT switch is connected to the fourth terminal 133 of the second six contact switch 113. The second terminal of the fifth SPDT switch 102 is connected to a second input of summing amplifier B.

The output of the Z operational amplifier is connected to the common terminal of the sixth SPDT 103. One terminal of the sixth SPDT switch 103 is connected to the third input of the summing amplifier B. The second terminal of the sixth SPDT switch 103 is connected to the fifth terminal 135 of the second sixth contact switch 113. Finally, the output of summing amplifier B is connected to the sixth terminal 137 of the second six contact switch 113.

The common terminal of the first six contact switch 111 is connected to an output terminal 139. Similarly, a common terminal of the second six contact switch 113 is connected to a second output terminal 141. These first and second output terminals are connected to any X–Y plotting device such as an oscilloscope or an X–Y plotter, for example.

In operation, the analog signal from the signal processing system of FIG. 3 is manipulated by the signal processing network of FIG. 4. That is, by suitably adjusting the various switches illustrated in FIG. 4, various outputs can be displayed or plotted. More specifically, the analog signal from the signal processing system of FIG. 3 contains data related to the static and dynamic characteristics of the model. And, by suitably adjusting the switches of FIG. 4, this data can be displayed on either an oscilloscope of an X-Y plotter. In addition, the switches can be adjusted so that data related to the location of the trolley, the location of the turntable, or other desired data can be displayed. These displays are determined by the setting of the various switches and are controlled by the adjustment of the operational amplifiers. Hence, the signal processing network illustrated in FIG. 4 processes the signal from the combining system of FIG. 3 as well as processes signals relating to the location and condition of the traveling sensor.

It will be appreciated that the signal processing network illustrated in FIG. 4 is rather uncomplicated. By merely adjusting a plurality of simple switches, various desired information about the vibrational characteristics of the model can be displayed. Alternatively, the switches can be adjusted so that data representing the condition or location of the traveling sensor can be displayed. It will also be appreciated that while the switches illustrated in FIG. 4 are manually controlled, these switches can also be automatically controlled. That is, data can be displayed in a sequential manner by sequentially, automatically adjusting the setting of the switches. Hence, the system can be utilized in areas where human attendance is not possible.

It will be appreciated by those skilled in the art and others that the invention as hereinabove described is very flexible in its design. For example, one trolley to support a non-contacting deformation measuring sensor can be used for various geometrically configured tracks—the track geometry being dictated by the model geometry. In addition, in many environments, a single turntable can be used with a plurality of tracks. Moreover, this system by employing solid state electronics can utilize small servo motors. Hence, the large, bulky servo motors of prior art systems are eliminated. Further, many different data display formats are available to the test engineer utilizing the invention. Finally, the accuracy of the overall system is good, it is only limited by the transducer or sensor sensitivities and the signal-to-noise ratio of the system.

While a specific embodiment of the invention has been hereinabove described, it will be appreciated that the invention can be varied within the scope of this general teaching. Specifically, various other types of geometrical configurations can be surface surveyed by this system. That is, the invention is not limited to the geometrical configurations illustrated in FIGS. 2A-D. Further, signal processing networks other than that illustrated in FIG. 4 will be obvious to those skilled in the art. Hence, the invention may be practiced otherwise than as specifically described herein.

What is claimed is:

1. Apparatus for surveying the surface of an arbitrarily shaped vibrating model to provide information about the static and dynamic surface deformation characteristics of said arbitrarily shaped model comprising:

a noncontacting measuring sensor located near the surface of said model at a measuring location for producing electrical signals indicative of the vibrations of said model at said measuring location;

a noncontacting reference sensor located near the surface of said model at a reference location for producing electrical signals indicative of the vibrations of said model at said reference location;

servo loop means connected to said noncontacting measuring sensor for maintaining said noncontacting measuring sensor a predetermined average distance from said model; and means connected to the outputs of said noncontacting measuring sensor and said noncontacting reference sensor for reproducing the positive and negative half cycles of said electrical signals indicative of the vibrations of said model at said measuring location as a series of positive continuous half waves if the outputs of the two noncontacting sensors are in phase and as a series of negative continuous half waves if the outputs of the two noncontacting sensors are out of phase whereby the amplitude of the output of the last means is indicative of the amplitude of the vibrations of said model at said measuring location and the polarity of the output of the last means is indicative of the phase of the vibrations of the model at said measuring location relative to the vibrations of said model at said reference location.

2. Apparatus according to claim 1 wherein said means for reproducing the positive and negative half cycles of said electrical signals comprises:

an amplifier with a positive input and a negative input; and a gate for connecting the output from said measuring sensor to said positive input of said amplifier while the output from said reference sensor is positive and for connecting the output from said measuring sensor to said negative input of said amplifier while the output from said reference sensor is negative.

3. Apparatus according to claim 1 including means for moving said noncontacting measuring sensor over the surface of said model to continuously change said measuring location.

4. Apparatus according to claim 3 including means receiving inputs from said means connected to the outputs of said noncontacting measuring and reference sensors; from said servo loop means and from said means for moving said noncontacting measuring sensor over the surface of said model for processing and manipulating these inputs for suitable displays on an oscilloscope.

5. Apparatus according to claim 4 wherein said means for processing and manipulating includes cosine resolvers, summing devices, potentiometers and switches.

References Cited

UNITED STATES PATENTS

| | | | |
|---|---|---|---|
| 3,089,332 | 5/1963 | Comstock, Jr. | 73—71.4 |
| 3,263,167 | 7/1966 | Foster et al. | 73—71.4X |
| 3,353,098 | 11/1967 | Foster et al. | 73—71.4UX |
| 3,379,972 | 4/1968 | Foster et al. | 73—71.4X |

CHARLES A. RUEHL, Primary Examiner